INFORMATION HANDLING AND STORING APPARATUS

Filed Sept. 8, 1967 4 Sheets-Sheet 1

INVENTORS
DAVID F. WOLFE
ROBERT E. SPINNER
BY
ATTORNEY

INFORMATION HANDLING AND STORING APPARATUS

Filed Sept. 8, 1967 4 Sheets-Sheet 2

INVENTORS
DAVID F. WOLFE
ROBERT E. SPINNER
BY

ATTORNEY

INFORMATION HANDLING AND STORING APPARATUS

Filed Sept. 8, 1967 4 Sheets-Sheet 3

INVENTOR
D. F. WOLFE
R. E. SPINNER
BY

ATTORNEY

*INVENTORS*
DAVID F. WOLFE
ROBERT E. SPINNER

United States Patent Office 3,414,177 Patented Dec. 3, 1968

3,414,177

INFORMATION HANDLING AND STORING APPARATUS

Robert E. Spinner, 26 Deer Trail Road, North Caldwell, N.J. 07006, and David F. Wolfe, 173 Riverside Drive, New York, N.Y. 10024

Continuation-in-part of applications Ser. No. 475,064, July 27, 1965, and Ser. No. 613,690, Oct. 24, 1966. This application Sept. 8, 1967, Ser. No. 674,371
26 Claims. (Cl. 225—94)

ABSTRACT OF THE DISCLOSURE

The disclosure is of apparatus which includes an information-entering assembly comprising a blank punch card and a support plate mounted on a suitable support portion of a housing and adapted to have master information cards seated on the blank punch card one at a time for entering information. Each master information card has a group of apertures, each aperture being associated with a unit of information and each group of apertures also being associated with a corresponding group of information-receiving areas in the punch card. A group of these master information cards is mounted adjacent to the information-entering assembly. Information can be entered by punching holes in the punch card or by making other markings which can be read optically or electrically. The information can also be entered electrically through electrical circuit elements associated with each information unit for transmittal to remote electronic circuitry.

This application is a continuation-in-part of application Ser. No. 475,064, filed July 27, 1965, now abandoned, and application Ser. No. 613,690, filed Oct. 24, 1966, now abandoned.

This invention relates to apparatus for handling and storing information and, particularly, for entering and storing information in blank punch cards.

There are many types of data collecting and processing operations which are still performed by human operators, with or without the ultimate assistance of electronic computers. The taking of public opinion polls is one operation of this type. Poll-taking generally includes the steps of preparing a list of questions on one or more sheets of paper, interviewing an individual, and marking the given answers for each person interviewed on a sheet of paper, returning the answer sheets to a headquarters, entering the various answers in blank punch cards, and, finally, processing the punch cards through a computer. It is clear that a relatively large number of operating steps and sheets of paper are involved in such a poll-taking operation, and, as a result, considerable time and manpower are required.

Accordingly, the objects of the present invention generally concern the provision of apparatus for simplifying and speeding up information taking and processing operations.

The objects of the invention also concern the provision of improved apparatus for handling units of information and for entering and storing units of information in a punch card, the apparatus also being adapted to permit constant monitoring and reading back of stored information.

Briefly, the apparatus of the invention includes a support member which carries at one portion thereof a plurality of master information cards which carry information to be entered in blank punch cards. The support member includes at another portion thereof an assembly for supporting a blank punch card and one of the master information cards during the process of entering information in the punch card. The assembly comprises, briefly, a support for the blank punch card and means for placing the master information card on the punch card. The information carried by the master card is represented by a plurality of perforations, and information is entered in the punch card by perforating the card in an area corresponding to the location of the pertinent perforation in the master card. The apparatus also includes a novel arrangement for removing and storing master cards after use.

Figure 1:
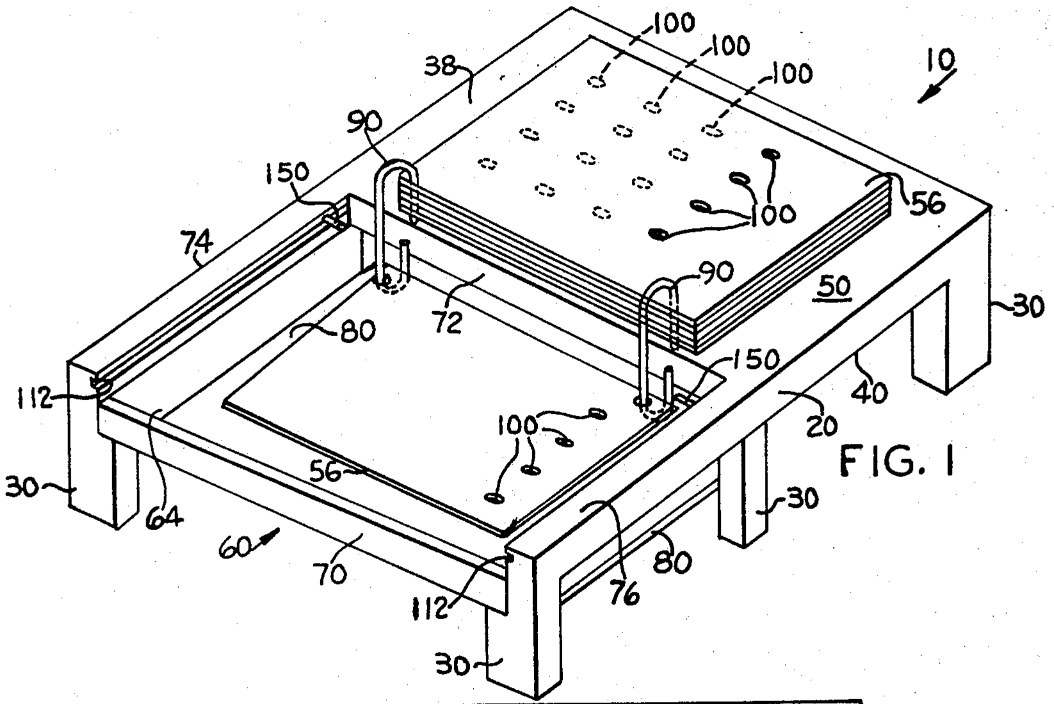
FIG. 1 is a perspective view of the invention.
Figure 2:
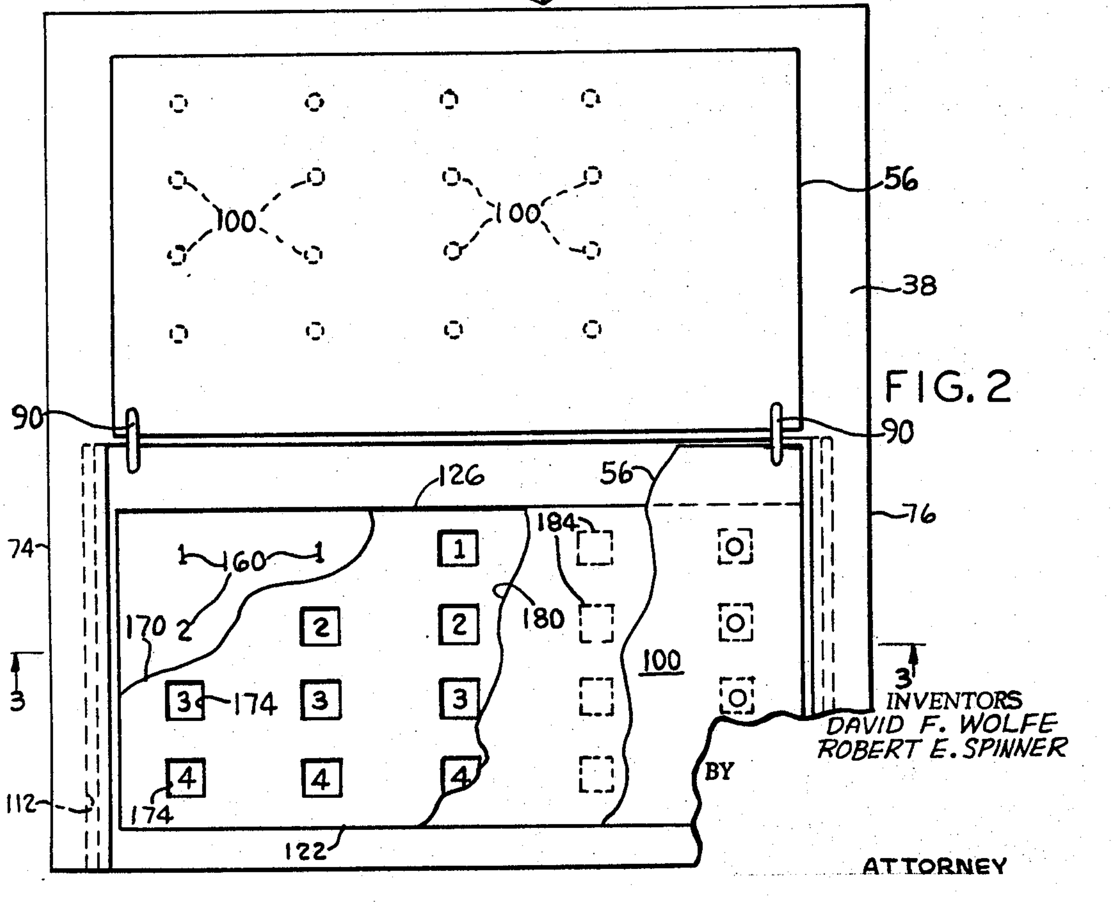
FIG. 2 is a plan view of the apparatus of FIG. 1.
Figure 3:
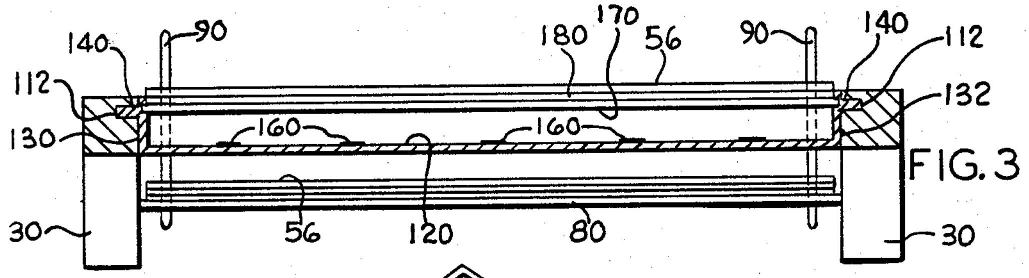
FIG. 3 is a view along the line 3—3 in FIG. 2.

Referring to FIGS. 1, 2, and 3, information handling apparatus of the invention 10 includes a support member 20 which is generally in the nature of a thin, flat, rigid plate horizontally supported on suitable legs 30 and including a top surface 38 and a bottom surface 40. The support member 20 is constructed so that it comprises a first tray portion 50 which is adapted to support a stack of master information cards 56 and a second portion 60 which is open for the most part, with the opening 64 defined by a surrounding frame including front wall 70, rear wall 72, and side walls 74 and 76. The opening 64 in the second portion 60 of support member 20 is adapted to permit master information cards 56 to pass therethrough onto a suitable storage table 80 after the cards have been used. The storage table 80 is supported in any suitable fashion beneath the opening 64.

The support member 20 carries a plurality of ring-like card retainers 90 oriented on a line between the first and second portions 50 and 60 of support member 20. The master cards 56 are threaded on the rings 90 in the usual fashion. Preferably, the ring members 90 are generally C-shaped, with a considerable portion of the length extending below the tray so that the master cards 56 can still be carried on the rings after they have been used and are deposited on the storage table 80.

The master information cards 56 are all of substantially the same size, and each carries a plurality of perforations 100, each of which may be physically associated with information or a written question on the card, or each perforation may merely represent information which is to be entered in a blank punch card. The perforations 100 carried by each card may be oriented in any suitable fashion, and, for purposes of illustration, the perforations are shown arranged in a vertical column. The column of perforations carried by each card is offset from the column carried by cards adjacent to it, for reasons which will become clear as the remainder of the apparatus is described. Thus, the top card may have its column of perforations adjacent to an edge of the card; the next card may have its column of perforations displaced to the right, for example, by one inch; the next card may have its column of perforations displaced by two inches, etc.

The second portion 60 of the support member slidably supports information entering apparatus 110 (not shown in FIG. 1 for clarity) by means of a track 112 formed in the side walls 74 and 76 which define the opening 64 therein. The information entering apparatus or assembly 110 comprises a box-like housing which includes a base 120, a vertical front wall 122, a vertical rear wall 126, and two vertical side walls 130, 132. Each side wall is provided on its outside with a horizontal flange or lip 140 which engages and rides in the track 112 to permit the information entering assembly 110 to move into and out of operating position which may be identified by suitable markings on the second portion 60 of the support member or by stop members 150 in the track 112.

The base 120 of the assembly 110 is used as a read-back or monitoring means and is either imprinted directly with parallel columns of numberals 160 or it supports a separate card or plate (not shown) which carries the columns of numerals. Each column of numerals is adapted to be aligned with a column of apertures 100 in one of the master information cards and in blank punch cards to be described, and the number of numerals in each column corresponds to the number of perforations in a column in each master card. For purposes of illustration, four perforations and four numerals are shown in each column. The box-like housing also carries a metallic support plate 170 spaced from and positioned horizontally above the base of the box. The plate is suitably supported, for example, in slots in the side wall of the housing. The support plate 170 is provided with a plurality of columns of apertures 174 through which the numerals 160 in the columns on the base are visible. The columns in the plate 170 are equal in number and content to the columns and number of perforations in each column in the master cards 56. Supported on the metal plate is a blank punch card 180 into which information from the master cards 56 is to be entered. For this purpose, the blank punch card 180 is provided with scored areas 184 which may be readily removed and which are oriented in columns corresponding to the columns of perforations in the master cards. It is clear that the columns of scored areas 184 are aligned with columns of perforations 174 in the metal plate 170 and with the columns of numerals 160 on the base 120 of the housing. It is understood that suitable means are provided for properly aligning the support plate 170 and the punch card 180 with each other and with the base of the housing. The housing of assembly 110 may carry suitable markers or guides (not shown) for this purpose.

In operation of the apparatus of the invention, the box-like information-entering assembly 110 is placed in operating position by being pushed forwardly in the track 112 to the desired location as indicated by its contact with the stop members 150. With a blank punch card 180 in place on the support plate 170, the first master information card 56 to be utilized is moved on the rings 90 from its position on the tray portion 50 to a position on the punch card 180. The column of perforations 100 in the master card is aligned with a column of scored areas 184 in the blank punch card. The desired information is entered in the blank punch card by punching out selected scored areas, for example, by inserting a stylus through the appropriate perforation in the master card. After the desired information has been entered from the master card, the information assembly 110 is moved forwardly in the track 112 until the opening 64 in the support member is exposed and the first master card is dropped through the opening on the rings. The master card comes to rest on the card storage table 80. The information assembly 110 is then moved back into operating position, and the next master card 56 is moved into place on the blank punch card. The column of perforations 100 in the new master card is aligned with a different column of scored areas in the blank punch card. The desired information is now entered in the blank punch card, and, after this operation has been completed, the assembly 110 is removed, and the master card is again allowed to drop onto the other card or cards supported on the storage table. This operation is repeated for each master code card, as desired.

It can be seen that, at all times during the operation of entering information in a punch card, the operator can read back information by viewing numerals 160 on the base 120 of the box-like assembly 110 through perforations in the blank punch card and in the support plate 170.

In the following modifications of the invention, all of the details of the master cards 56 and information-entering assembly 110 are not shown.

Figures 4, 5, 6:
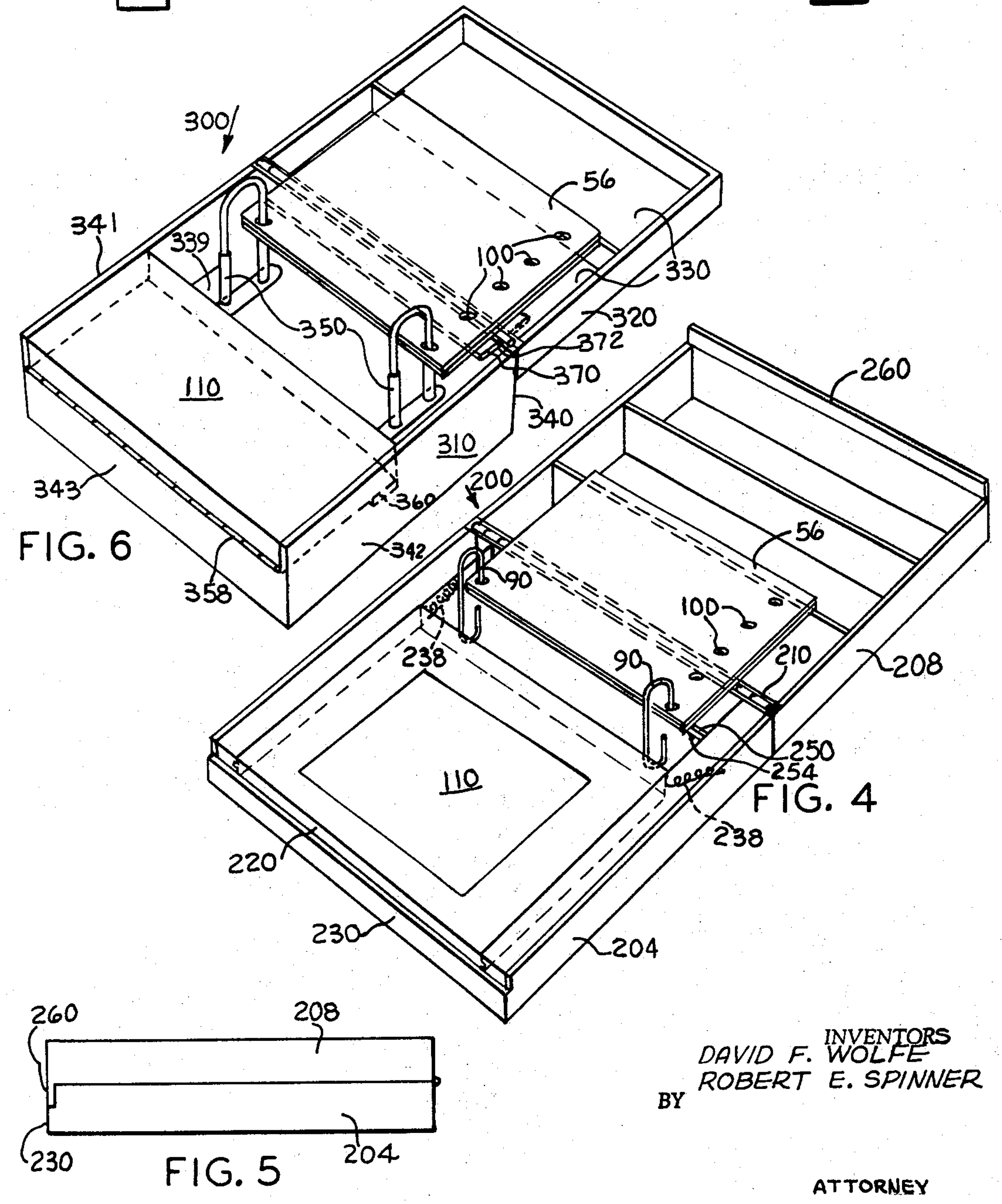
FIG. 4 is a perspective view of a modification of the invention, as it appears open for use.
FIG. 5 is a side view of the apparatus of FIG. 4 closed.
FIG. 6 is a perspective view of another form of the invention.

A modification of the invention shown in FIG. 4 includes a two-part case 200 which comprises a first part 204 and a second part 208 hinged together so that they can rotate with respect to each other along a suitable hinge 210 provided between them. Thus, the second part can be rotated until it overlies the first part and serves as a cover therefor. The first and second case parts 204 and 208 are preferably hollow. The top surface of first case part 204 includes a rectangular opening similar to opening 64 in FIG. 1, which extends from the front edge of the first case part rearwardly toward the central hinge a convenient distance. The side edges of the top surface which define the sides of the opening are suitably grooved or otherwise formed to slidably receive a generally rectangular slide plate 220. The slide plate 220 includes a rectangular opening which is adapted to receive the information-entering assembly 110 described above. A pair of springs 238 (one of which is shown) are secured between the slide plate 220, for example, the front end thereof, and the surrounding case 200 to bias the slide plate in a forward direction.

A rotatable axle 250 is suitably secured to the top surface at the rear edge 254 of the opening therein, and the axle carries the C-rings 90 for holding master information cards as described above. Thus, the C-rings, because they are secured to a rotatable axle, are themselves rotatable. The C-rings rise above the top surface and extend downwardly into the hollow first case part where, as above, used information cards 56 can be stored. No storage table is required in this embodiment of the invention. The dimensions are such that the back wall of the first case part will permit the C-ring axle 250 to pivot clockwise or counter-clockwise until the C-ring is substantially horizontal and does not project above the top surface.

The front wall 230 of the first case part rises from the base, but it does not extend the entire distance between the bottom wall and the top surface of the first case part, for a purpose to be described.

The second case part is similar to the first part, except that it is provided with a short wall 260 which rises above its top surface at its rear edge. This short wall is intended to mate with the shortened front wall 230 of the first case part when the case is closed.

The coding apparatus is used generally as described above. When a master code card 56 has been used, the slide 220 is moved forwardly, and the card 56 is dropped through the opening into the chamber in the first part 204. When it is desired to close the two-part case 200 for carrying, the C-ring assembly is rotated counter-clockwise as seen in FIG. 4 so that it is substantially horizontal, and the cards remaining above the case are placed on the coding assembly 110. The cover 208 is then rotated into place covering the first part as shown in FIG. 5. If the wall 260 provides sufficient clearance, it may not be necessary to rotate the C-rings 90 out of position to close the case.

Another embodiment of the invention shown in FIG. 6 includes a two-part box-like case 300 comprising a first base member 310, to which a cover member 320 is hingedly secured along abutting edges of both first and second members. The cover member 320 is compartmented to provide storage areas 330 for punch cards or the like. The base portion 310 is deeper than the cover member and includes a floor 339, a rear wall 340, side walls 341, 342, and a front wall 343. Adjacent to the rear wall 340 and secured to the floor 339 are positioned telescoping U-shaped ring-like card holders 350 for holding master information cards 56. The ring card holders 350 are adapted to telescope and collapse to a minimum height below the height of the side walls of the base, and telescope and expand to a maximum height above these side walls.

The information-entering assembly 110 is hinged to the front wall 343 by hinge 358, with its rear end resting on a horizontal support bar 360 which is secured to the side walls 341 and 342 and extends horizontally between them. The front wall 343 is shorter than the rear wall and side walls so that the top surface of assembly 110 lies at the same level as the top of the side walls.

An auxiliary horizontal master card support plate 370 is hingedly supported along the rear wall by hinge 372 and is adapted to occupy two positions, (1) inside the base as shown or (2) in the cover as shown in dash lines to support master cards.

The operation of this embodiment of the invention is substantially the same as that described. Master cards 56 are placed one by one on the assembly 110, and, as each card is used, the assembly 110 is pivoted about hinge 358 and the card is dropped into the storage chamber of base member 310.

Another embodiment of the invention 250 comprises a housing 258 which includes a base 260, a cover member 264, and a handle 268 which may be used for carrying the apparatus or for supporting it in use. The base 260 includes a first portion 270 which comprises a vertically elongated container for cards, pencils, or the like. A hinged or slidable cover 274 having an operating tab 276 is provided for covering this first portion. The base 260 also includes a second portion 280 rearward of the first portion which is not as deep as the first portion and serves as a support for the information-entering assembly 110 which is slidably mounted thereon. The assembly 110 is slidably operated by means of tab 281. Beneath assembly 110 is provided a shallow chamber for receiving used master information cards, and, if desired, a door 286 may be provided in the base of the second portion 280 accessible from below for the purpose of reaching master information cards and pushing them up to their before-use position to be described below.

The cover 264 is hinged to the rear end of the second shallow portion 280 of the base 260 and is adapted to be pivoted into closed position overlying the information-entering assembly 110 or to be pivoted rearwardly to the open position to expose the information-entering assembly 110 for use. The master information cards 56 are carried on a holder 290 which includes a bar 294 to which are secured a pair of spaced-apart, curved, card-holding rods or wires 296 which have a connecting piece 297 between them. The bar 294 is adapted to be inserted in a trough-shaped holder 300 secured to the inside of the cover member with the rods 296 shaped to extend into the shallow chamber beneath the information-entering assembly 110. Before they are used, the master information cards are supported against the inner surface of the cover, and, after use, each is dropped on the wire supports 296 into the shallow chamber. It is clear that the entire master information card assembly is removable from trough 300 so that different sets of cards can be used and sets can be conveniently carried or sent from place to place.

The handle 268 is adapted for use in carrying the apparatus 10 when it is not in use, and, when the apparatus is in use, the handle and the base 310 of the first portion 270 can be used to support the apparatus on a table. If it is desired to hold the apparatus 10 in the arms as it is being used, the first portion 270 is so shaped that it may be readily supported between the body and the forearm of the user of the apparatus, with the base of portion 280 resting on the forearm.

It is clear that modifications may be made, within the scope of the invention, in the specific pieces of apparatus described above. One area of modification is the blank "punch" card which is basically an information-receiving card and need not actually be a punch card. Thus, the invention could be used to enter information in other ways than by punching out a portion of the card. For example, the information could be entered by means of markings in color, or by some type of magnetic or non-magnetic ink marking which could later be read optically or electronically.

Figure 7:
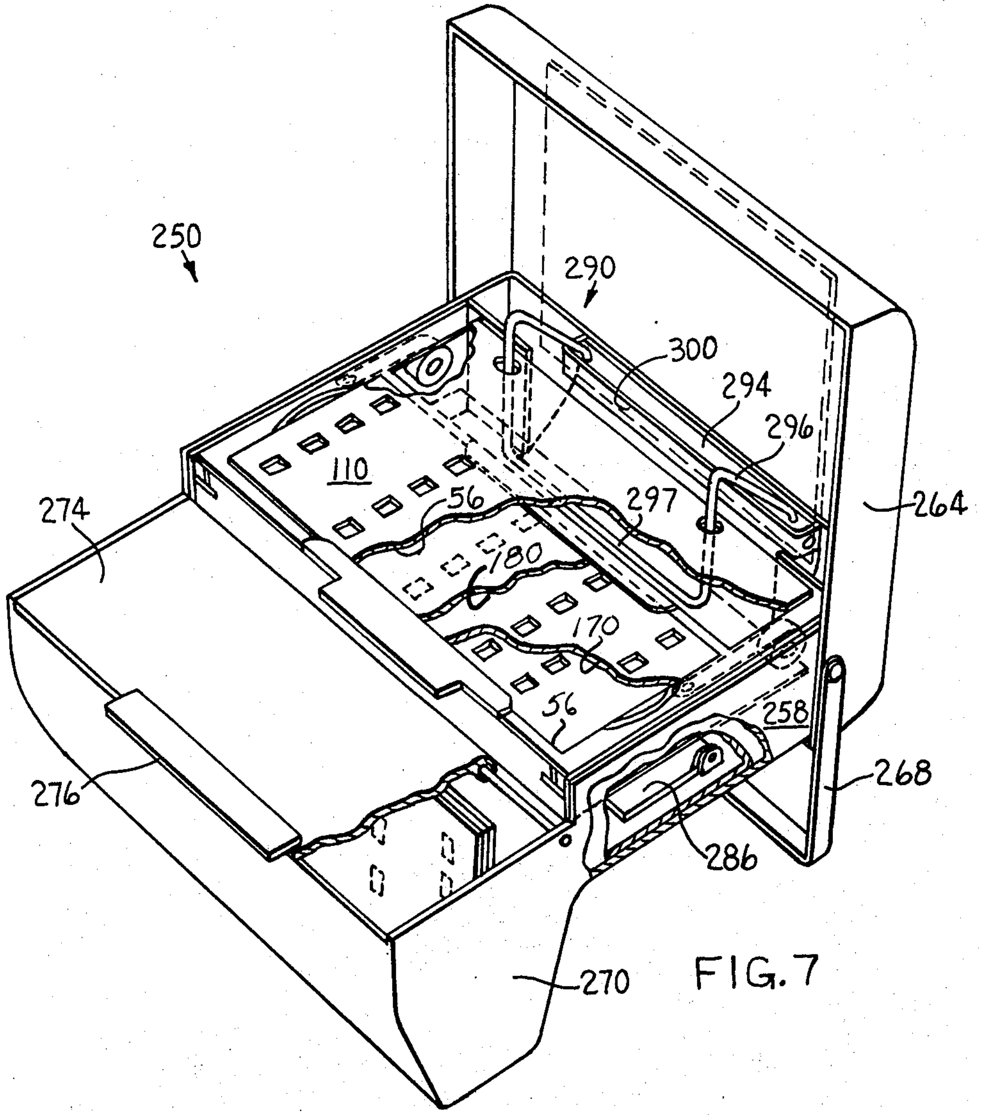
FIG. 7 is a perspective view of another form of the invention.
Figure 8:
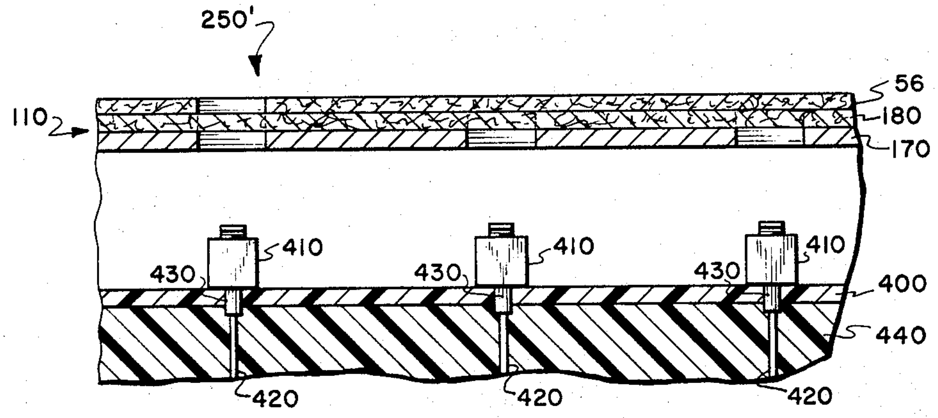
FIG. 8 is a sectional view of a modification of the invention.

A modification of the invention is shown in FIG. 8, and the principles of its operation may be employed with any of the forms of the invention described above, for example, apparatus 250 shown in FIG. 7. Only enough detailed structure is shown to illustrate the principles of the invention. The apparatus 250′ shown in FIG. 8 is adapted for performing its information-entering function in conjunction with a computer or other remote electronic apparatus. In this embodiment of the invention, the information-entering assembly 110 includes a stack of master information cards 56, as described above, one of which is shown positioned on a punch card 180 which is seated on support plate 170. Rows and columns of holes and scored areas (in punch card) are aligned as described above. It is to be noted that the blank punch card may or may not be used in this embodiment of the invention. If it is desired to provide both a punch card record and an electronic record, to be described, then the punch card is included in the information-entering assembly 110.

In accordance with the invention, the base or floor 400 of the housing beneath information-entering assembly 110 (without door 286 shown in FIG. 7) is provided with rows and columns of electronic switches 410 which correspond in number and location to all of the aligned holes to be found in the components of the master information assembly positioned above it. The switches 410 are electrically connected in any suitable fashion represented by leads 420 to external electronic circuitry, for example, electronic computers, electronic information storage circuits, or the like. The leads 420 may run from the switches to terminals in the base or side wall of the housing 258, from which connections are made to the external electronic equipment. In one particularly suitable arrangement, the switches 410 are mounted in base 400, as described above, and they include terminals 430 which are accessible externally beneath the lower surface of base 400 and outside the housing of the apparatus. In this case, the entire apparatus may be mounted on and, in effect, plugged into a desk-type console represented by numeral 440 which includes connections to a computer or other apparatus. The desk console thus serves as a mechanical support and as an electrical connector.

In operation of this embodiment of the invention, the user enters information by inserting a stylus or pencil or the like through an opening in a master information card 56 and through the other members of assembly 110 until it closes the associated switch 410 which transmits an electrical impulse to the external circuitry where it is registered as desired. Any number of units of information can thus be entered and transmitted to a remote location.

It will be clear to those skilled in the art that means other than switches may be used for operation with the master information cards; for example, capacitive pickups might also be used. In addition, it is clear that the switches 410 may be insulatingly mounted in the support plate 170, or they may be mounted in any other suitable manner in alignment with the holes in the information-entering assembly.

Figure 9:
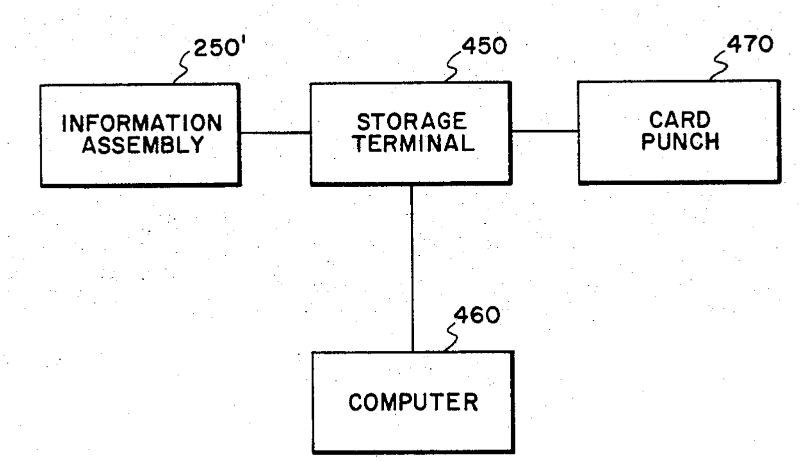
FIG. 9 shows a block system of the invention.

Another useful system in which the apparatus of the invention might be used is shown in block diagram in FIG. 9. The system includes the apparatus 250′ (shown in FIG. 8) represented by block 250′ and coupled to an electronic information-receiving and storing terminal 450 of any suitable type in which information from apparatus 250′ may be stored. Terminal 450 is coupled both to a computer 460 in which the information may be processed and to a card-punching mechanism 470 which is used to enter in punch cards the same information entered originally in the apparatus 250' and transmitted from apparatus 250'.

What is claimed is:

1. Information-handling apparatus comprising
a two-part support member,
a stack of master information cards supported on one part of said support member,
an information-entering assembly removably positioned on the other part of said two-part assembly and adapted to support a master information card during an information-entering process,
a card storage area in said other part of said member,
said assembly being removable to permit used master information cards to be stored in said card storage area,
said master cards each carrying a pattern of apertures representing information, the pattern of apertures of each card being offset physically from the pattern of apertures of every other card so that a plurality of master cards can be used with one blank punch card.

2. The apparatus defined in claim 1 wherein said information-entering assembly is slidably mounted on said support member.

3. The apparatus defined in claim 1 wherein said information-entering assembly is hingedly mounted on said support member.

4. The apparatus defined in claim 1 wherein said information-entering assembly is mounted on a slide plate which is slidably mounted on said support member.

5. The apparatus defined in claim 1 and including a ring assembly on said support member on which said master cards are threaded.

6. The apparatus defined in claim 1 and including a ring assembly on said support member on which said master cards are threaded, said ring assembly being pivotally mounted on said support member.

7. The apparatus defined in claim 1 and including a ring assembly on said support member on which said master cards are threaded, said ring assembly comprising a plurality of telescoping members mounted on said support member.

8. The apparatus defined in claim 1 wherein said two parts of said support member include storage chambers for master cards and punch cards and the like.

9. The apparatus defined in claim 1 wherein said other part of said support member includes a track in which said information-entering assembly is slidably mounted.

10. The apparatus defined in claim 1 wherein said information-entering assembly is a generally box-like member having a base on which columns of numerals are provided, a perforated support plate positioned above said base, and a punch card positioned on said support plate and having scored areas aligned with the perforations in said support plate and with the columns of numerals on said base.

11. The apparatus defined in claim 1 wherein said information-entering assembly is a generally box-like member having a base on which columns of numerals are provided, a perforated support plate positioned above said base, and a punch card positioned on said support plate and having scored areas aligned with the perforations in said support plate and with the columns of numerals on said base, said apertures in said master information cards being arrayed in columns, each master card having one column of apertures aligned with a different column of scored areas in a punch card.

12. The apparatus defined in claim 1 wherein the two parts of said two-part member are hingedly connected so that one part can rotate with respect to the other and can serve as a cover therefor.

13. Information-handling apparatus comprising
a support member,
an information-entering assembly removably positioned on said support member and adapted to support a blank information-receiving card and a master information card during an information-entering process,
a storage area beneath said information-entering assembly,
said assembly being movable to provide access to said storage area,
means adjacent to said assembly supporting a stack of master information cards in operative relation with said assembly whereby each card can be moved from its storage position to an operative position on said assembly and then, after the card is used, movement of said assembly to expose said storage area, permits the card to be deposited in said storage area,
said master cards each carrying a pattern of apertures representing information, the pattern of apertures of each card being offset physically from the pattern of apertures of every other card so that a plurality of master cards can be used with one blank information-receiving card.

14. The apparatus defined in claim 13
wherein said support member includes a covered chamber positioned in front of said information-entering assembly providing both a storage area and a writing surface for the user of the apparatus,
said support member also having a cover member hingedly secured thereto,
said master information cards being removably mounted on said cover member in operative relation with said information-entering assembly.

15. The apparatus defined in claim 13
wherein said support member includes a covered chamber positioned in front of said information-entering assembly providing both a storage area and a writing surface for the user of the apparatus,
said support member also having a cover member hingedly secured thereto,
a trough-shaped receiver on the inner surface of said cover member,
said master information cards being mounted on a unitary holder removably seated in said trough-shaped receiver so that, initially, the master information cards rest on the inner surface of said core member and they can be moved one at a time into operative relation with said information-entering assembly.

16. Information-handling apparatus comprising
a two-part support member,
one part of said support member being adapted to support master information cards,
an information-entering assembly removably positioned on the other part of said two-part support member and adapted to support a master information card during an information-entering process,
a card storage area in said other part of said member,
said assembly being removable to permit used master information cards to be stored in said cards storage area,
said master cards each carrying a pattern of apertures representing information, the pattern of apertures of each card being offset physically from the pattern of apertures of every other card so that a plurality of master cards can be used with one blank punch card.

17. The apparatus defined in claim 16 and including electrical apparatus associated with each aperture in each master information card for providing an electrical impulse for each unit of information stored.

18. The apparatus defined in claim 17 and including circuit means coupling said electrical apparatus to remote electronic circuitry for storing information therein.

19. The apparatus defined in claim 17 and including external electrical contacts secured to said housing and each coupled to said electrical apparatus.

20. The apparatus defined in claim 17 wherein said electrical apparatus comprises switches.

21. The apparatus defined in claim 17 and including circuit means coupling said electrical apparatus to a remote electrical storage terminal, and circuit means coupling said storage terminal to both an electronic computer and to card punching apparatus for entering the stored information therein.

22. Information-handling apparatus comprising a support member, an information-entering assembly removably positioned on said support member and adapted to support a master information card during an information-entering process, a chamber beneath said information-entering assembly, means adjacent to said assembly supporting a stack of master information cards in operative relation with said assembly whereby each card can be moved from its storage position to an operative position on said assembly, said master cards each carrying a pattern of apertures representing information, the pattern of apertures of each card being offset physically from the pattern of apertures of every other card so that a plurality of master cards can be used with one blank information-receiving member, and a separate electrical device secured to said support member and associated with each aperture in said master information cards, each electrical device being adapted to generate an electrical impulse for each unit of information entered.

23. The apparatus defined in claim 22 and including circuit means coupling each said electrical device to remote electronic circuitry for storing information therein.

24. The apparatus defined in claim 22 and including external electrical contacts secured to said support member and each coupled to a separate one of said electrical devices.

25. The apparatus defined in claim 22 wherein said electrical devices comprise switches.

26. The apparatus defined in claim 22 and including circuit means coupling said electrical devices to a remote electrical storage terminal, and circuit means coupling said storage terminal to both an electronic computer and to card punching apparatus for entering the stored information therein.

References Cited

UNITED STATES PATENTS

| | | | |
|---|---|---|---|
| 3,221,961 | 7/1965 | Whitson | 225—93 |
| 3,240,409 | 3/1966 | Harris | 225—93 |

JAMES M. MEISTER, *Primary Examiner.*